July 7, 1936.  W. A. ABEGG  2,046,597
PACKING FOR JOINTS
Filed June 17, 1933
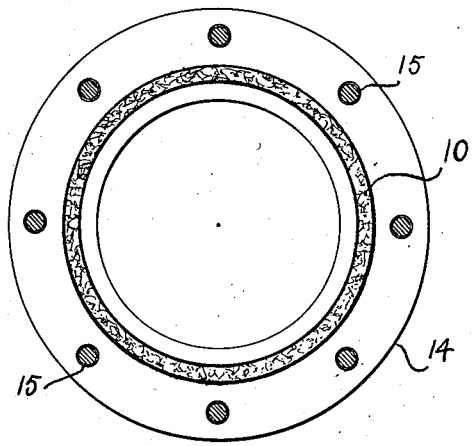
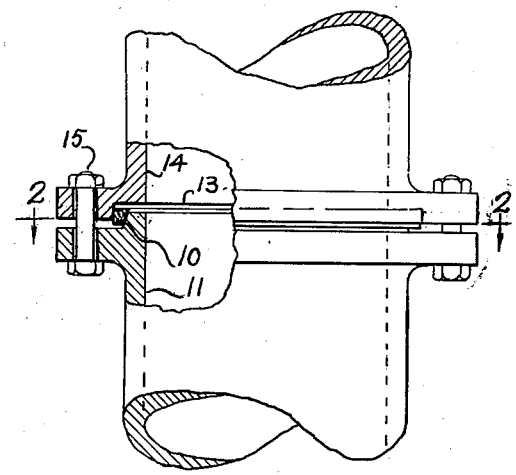
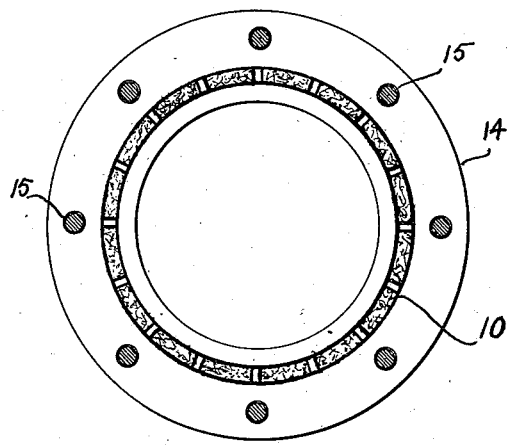
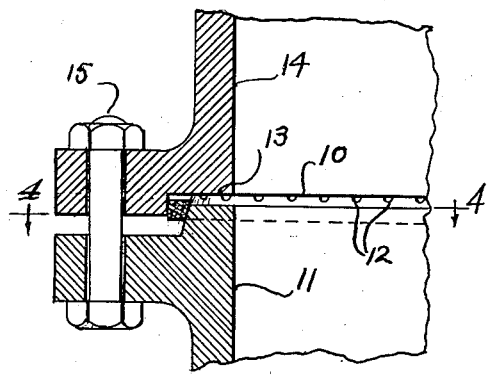
Inventor;
Walter A. Abegg Patented July 7, 1936

2,046,597

UNITED STATES PATENT OFFICE 2,046,597

PACKING FOR JOINTS

Walter A. Abegg, Los Angeles, Calif.

Application June 17, 1933, Serial No. 676,379

1 Claim. (Cl. 285—134)

This invention relates to gasket sealed joints for unions, valves, flanges and the like, intended for conducting or confining liquids or gases, preferably at high pressures.

In the case of gasket packings comparable to that of the ensuing description, there is a tendency of the gasket under pressure to open the jointure between the packing and the packing retaining members. This is due to the fact that it is customary to pack off along a flat ring surface at right angles to the center line of the pipe or line of flow. In order to prevent leakage, it is necessary that the bolt tension be vastly in excess of the strain set up by the fluid pressure. It is an object of this invention to provide a packing joint which will hold extremely high pressure with a minimum bolt tension. Another object is to provide a self-sealing, self-tightening joint, in which the fluid tends to increase the packing effect of the unit. A further object of this invention is to devise a joint with the aforementioned properties, which may be manufactured cheaply and economically without resorting to accurately ground and lapped fits which would make production costs prohibitive. It only requires a rough turned finish and accuracy within one sixty-fourth of an inch.

As will appear from the ensuing detailed description, these principal objectives are attained in that high pressure, which would otherwise tend to open the joints between gasket and retaining member are exerted in a dominating degree in a direction to overcome such tendency, and also to move the gasket in the direction of its original adjustment, to take up any looseness resulting from expansion, adjustment, shrinkage, etc., considered in connection with either the gasket or the coupling to which it is applied.

It will be understood that the material for the gasket will be metal, rubber, fiber or composition best adapted to resist deterioration from contact with the fluid with which it is intended to be employed; however, as the description progresses it will become apparent that lack of an ideal material for the gasket is of less importance than heretofore, since any tendency toward leakage is corrected before leakage actually occurs.

Figure 1 is a side view partly in section of a joint employing my invention. The gasket shown has a plain back, which is preferred.

Figure 2 is a plan in section taken at line 2—2 of Figure 1.

Figure 3 is an enlarged section showing the gasket with recesses in the back.

Figure 4 a plan in section taken at line 4—4 of Figure 3.

Figure 5 a section of a gasket with internal spherical radius, the mean tangent of which would correspond with the angle of the cone chosen.

The taper of the gasket rings 10 and inner coupling member 11 may be either a spherical radius as in Figure 5 or of conical radius as in Figure 1, as determined by the resultant effectiveness of a given ring material when in use under fluid pressure. The former will allow slight inaccuracies of alignment, a feature which, under certain field conditions will be desirable. The degree of the taper may be varied from 1 to 25 degrees to obtain best results from a given material under a given working pressure. Tapering the ring gasket internally rather than externally results in exposing the broader face of the gasket to the fluid under pressure; hence the effect of the pressure is to tighten the joint between the gasket and the parts of the coupling which in turn protects the joint against attack from the chemicals of the fluid. In order that the fluid under pressure may serve to continuously exert wedging force against the gasket ring, the broader face of the ring is provided with recesses 12 to receive the fluid.

In operation bolt tension applied to flanges 11 and 14 respectively wedges conical outer surface of flange 11 into conical inner surface of expanding packing ring 10, expanding it and forcing its cylindrical outer surface tightly against the cylindrical inner surface of the recess of flange 14. The pressure produced against the conical and cylindrical surfaces is governed by the angle of the wedge taper and is many times the pressure that occurs at the flat ring base of the packing ring. The fluid therefore, may get under the ring base assisting in packing off more tightly against the conical and cylindrical surfaces.

It will be seen that this invention is in no way similar to the ordinary metallic seat, unions and flanges now on the market. All of these devices have an inserted metallic seat which is an integral part of one-half of the assembly. The shut-off is effected by a flat, ball-shaped or beveled seat highly finished or ground.

It may be further pointed out that the arrangement described in this invention results in a much lighter flange and bolt construction. Under no circumstances are the bolts to carry more tension than what corresponds to the effective area of the joint under given pressure conditions. With the ordinary flat ring gasket the bolt tension must be greatly in excess of the above figure, because if it were not there would be no pressure between packing and flange under operating conditions. When loosening of the gasket commences, the pressure against the recess areas moves the ring initially away from the shoulder 13 in outer coupling 14 against which it is banked for the purpose of expansion and thereafter the entire area of the broader face of the ring receives pressure from the fluid. In the case of gaskets of softer materials and especially when the softer material is employed in connection with a taper of spherical radius, the effect of the pressure may be merely to spread the broad face of the ring but the sealing effectiveness of such spreading may be equivalent to actual movement of the entire body of the ring.

I do not limit my invention to the details and arrangement as shown for descriptive purposes which are not necessarily in preferred form under all conditions and in all circumstances except as I may be limited by the hereto appended claim.

I claim:

A packing joint for tubular conduits which are to be coupled together and which tubular conduits telescope one within the other, comprising a tubular conduit having a counterbore in one end thereof, said counterbore forming an annular shoulder within said conduit and providing a straight cylindrical and longitudinally extending packing seat, a second conduit formed with a conical externally tapered lip adapted to fit within and spaced from the counterbore of the first named conduit, said tapered lip forming an annular space between itself and the straight cylindrical and longitudinally extending packing seat of the first named conduit, an annular packing ring internally tapered to conform to and circumscribe the tapered portion of the second named conduit and formed with a flat end face, and an external face to lie against the straight cylindrical and longitudinally extending packing seat of the first named conduit, the transverse sectional area of the said packing ring being sufficient to fill the annular space between the packing seat and the tapered lip portion, the sectional height of the packing ring being less than the longitudinal length of the annular space between the packing shoulder and the tapered lip portion so as to maintain a fluid space between the end face of the packing ring and the internal face of the counterbore whereby the pressure of the fluid against the end face of the packing ring will force the packing ring more firmly into the unoccupied portion of the annular space.

WALTER A. ABEGG.